United States Patent
Moinuddin et al.

(10) Patent No.: US 10,880,752 B1
(45) Date of Patent: *Dec. 29, 2020

(54) METHOD FOR SPECTRUM SENSING UNOCCUPIED FREQUENCY

(71) Applicant: King Abdulaziz University, Jeddah (SA)

(72) Inventors: Muhammed Moinuddin, Jeddah (SA);
Ubaid M. Al-Saggaf, Jeddah (SA);
Mohammed A. Alrefaei, Jeddah (SA);
Jawwad Ahmad, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/985,857

(22) Filed: Aug. 5, 2020

Related U.S. Application Data

(63) Continuation of application No. 16/869,796, filed on May 8, 2020.

(51) Int. Cl.
*H04W 16/14* (2009.01)
*H04W 24/08* (2009.01)
(Continued)

(52) U.S. Cl.
CPC .......... *H04W 16/14* (2013.01); *H04B 7/0897* (2013.01); *H04B 17/382* (2015.01); *H04L 27/0006* (2013.01); *H04W 24/08* (2013.01)

(58) Field of Classification Search
CPC ...... H04B 17/382; H04B 1/69; H04B 7/0897; H04B 17/345; H04W 16/14; H04W 24/08;
(Continued)

(56) References Cited

U.S. PATENT DOCUMENTS

| | | | |
|---|---|---|---|
| 9,608,803 B2 | 3/2017 | Alahmadi et al. | |
| 2010/0266002 A1* | 10/2010 | Du | H04B 17/345 375/224 |

FOREIGN PATENT DOCUMENTS

| | | |
|---|---|---|
| CN | 108401255 A | 8/2018 |
| JP | 2011-512742 | 4/2011 |

OTHER PUBLICATIONS

Ayman A. El-Saleh, Genetic algorithm-assisted soft fusion-based linear cooperative spectrum sensing, 2011, IEICE (Year: 2011).*

(Continued)

*Primary Examiner* — Harun Chowdhury
(74) *Attorney, Agent, or Firm* — Oblon, McClelland, Maier & Neustadt, L.L.P.

(57) ABSTRACT

A method for spectrum sensing for cognitive radio includes performing a process of local spectrum sensing using receive beamforming and energy detection at each of a plurality of secondary users included in a cognitive radio network, wherein the process of local spectrum sensing decides between two hypotheses corresponding to absence and presence of a primary user, the two hypotheses being formulated using a primary user signal, a plurality of co-channel interferences, and sensing noise, the primary user signal, the plurality of co-channel interferences, and the sensing noise being received at each of the plurality of secondary users, and a set of beamforming weights of the receive beamforming is determined by optimizing a probability of detection and constraining a probability of false alarm.

4 Claims, 9 Drawing Sheets

(51) Int. Cl.
*H04B 7/08* (2006.01)
*H04B 17/382* (2015.01)
*H04L 27/00* (2006.01)

(58) Field of Classification Search
CPC .. H04W 72/02; H04W 72/082; H04L 27/0006
USPC ......... 370/329, 338, 445; 375/224; 455/454, 455/500, 509
See application file for complete search history.

(56) References Cited

OTHER PUBLICATIONS

Mohammed A. Alrefaei, Genetic Algorithm with Multi-Parent Crossover for Cooperative Spectrum Sensing, 2015, IEEE Xplore (Year : 2015).*

Mohammed A. Alrefaei, et al., "Genetic Algorithm with Multi-Parent Crossover for Cooperative Spectrum Sensing", $1^{ST}$ International Conference on Telematics and Future Generation Networks (TAFGEN), 2015, pp. 17-21.

Mohammed A. Alrefaei, "Clustering Genetic Algorithm for Cognitive Radio Network", Journal of Engineering Research and Application, vol. 8, Issue 6 (Part-III), Jun. 2018, pp. 54-57.

Tejaskumar M. Gojariya, et al., "Cyclostationarity-Based Spectrum Sensing Using Beamforming Algorithm in Cognitive Radio Networks", International Conference and Workshop on Electronics & Telecommunication Engineering, 2016, pp. 63-69.

\* cited by examiner

METHOD FOR SPECTRUM SENSING UNOCCUPIED FREQUENCY

CROSS-REFERENCE TO RELATED APPLICATIONS

The present application is a Continuation of Ser. No. 16/869,796, pending, having a filing date of May 8, 2020.

BACKGROUND

Technical Field

The present disclosure relates to a multiple antenna-based spectrum sensing solution for cognitive radio.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Due to the rapid growth in wireless communication, the demand for spectrum segments is increasing. However, pre-existing fixed spectrum assignment policies have become less efficient due to wastage of unutilized spectrum when primary users are inactive or silent. This has heightened the need for opportunistic usage of spectrum. Recently, a cognitive radio network was proposed by Joseph Mitola, "Cognitive radio for flexible mobile multimedia communications," in IEEE International Workshop on Mobile Multimedia Communications, 1999. This network introduces opportunistic utilization of unoccupied frequency bands by licensed users (also known as Primary Users (PU).

The main objective of cognitive radio networks is to detect the existence of the PU and to assign available spectrum capacity to unlicensed or secondary users (SU) until the PU utlizes licensed spectrum capacity. Spectrum sensing is used to identify the availability of PU capacity and is achieved by estimation of vacant frequency bands as described in Maguire, J. I. Mitola and G. Q. J., "Cognitive radio: making software radios more personal," *IEEE Personal Commun. Mag*, vol. 6, no. 4, pp. 13-18, 1999— incorporated herein by reference.

Various spectrum sensing techniques have been developed to detect the availability of spectral holes. Most prominent among these techniques are energy detector based spectrum sensing as described in S. Shankar, C. Cordeiro, and K. Challapali, "Spectrum agile radios: utilization and sensing architectures," in *Proc. IEEE Int. Symposium on New Frontiers in Dynamic Spectrum Access Networks*, Baltimore, Md., USA, November 2005, Li, G. Ganesan and Y., "agility improvement through cooperative diversity in cognitive radio," in *Proc. IEEE Global Telecomm. Conf. (Globecom)*, St. Louis, Mo., USA, 2005, Lehtomaki, J., "Analysis of energy based signal detection," Finland, December 2005, and J. Y. Wu, C. H. Wang, and T. Y. Wang, "Performance analysis of energy detection based spectrum sensing with unknown primary signal arrival time.," *IEEE Transaction on Communications*, vol. 59, no. 7, pp. 1779-1784, 2011—each incorporated herein by reference in its entirety, waveform matching based spectrum sensing as described in Tang, H., "Some physical layer issues of wide-band cognitive radio systems," in *Proc. IEEE Int. Symposium on New Frontiers in Dynamic Spectrum Access Networks*, Baltimore, Md., USA, November 2005, and Shridhar Mubaraq Mishra; Stephan ten Brink; Ravi Mahadevappa; Robert W. Brodersen, "Cognitive technology for ultra-wideband/WiMax coexistence," in *Proc. IEEE Int. Symposium on New Frontiers in Dynamic Spectrum Access Networks*, April 2007—each incorporated herein by reference in its entirety, matched filter based spectrum sensing as described in L. Ma, Y. Li, and A. Demir, "Matched filtering assisted energy detection for sensing weak primary user signals," in *IEEE Int. Conf. Acoust. Speech Signal Process.*, March 2012, Kyoto, Japan, and X. Zhang, R. Chai, and F. Gao, "Matched filter based spectrum sensing and power level detection for cognitive radio network," in *IEEE Glob. Conf. Signal Inf. Process.*, Atlanta, Ga., USA, December 2014—each incorporated herein by reference in its entirety, autocorrelation based spectrum sensing as described in S. Chaudhari, V. Koivunen, and H. V. Poor, "Autocorrelation-based decentralized sequential detection of OFDM signals in cognitive radios," *IEEE Trans. Signal Process.*, vol. 57, no. 7, p. 2690-2700, July 2009—incorporated herein by reference in its entirety, cyclostationarity based spectrum sensing as described in Tugnait, G. Huang and J. K., "On cyclostationarity based spectrum sensing under uncertain Gaussian noise," *IEEE Trans. Signal Process.*, vol. 61, no. 8, p. 2042-2054, April 2013—incorporated herein by reference in its entirety, eigenvalue based spectrum sensing as described in S. K. Sharma, S. Chatzinotas, and B. Ottersten, "Eigenvalue-based sensing and SNR estimation for cognitive radio in presence of noise correlation," IEEE Trans. Veh. Technol., vol. 62, no. 8, p. 3671-3684, October 2013—incorporated herein by reference in its entirety, and wavelet based spectrum sensing as described in Giannakis, Z. Tian and G., "A wavelet approach to wideband spectrum sensing for cognitive radios," in *IEEE Int. Conf. Cogn. Radio Oriented Wireless Netw. Comm.*, Mykonos Island, Greece, June 2006—incorporated herein by reference in its entirety.

Energy detection spectrum sensing is the most popular technique due to its low computational requirements. This method relies on detecting the signal by comparing the energy at the output of the detector with a threshold, usually defined by the noise power. However, energy detector based spectrum sensing faces challenges in selection of the threshold for PU detection, difficulty in differentiation between interference and noise, and poor performance at low signal-to-noise-ratio as described in Tang, H., "Some physical layer issues of wide-band cognitive radio systems," in *Proc. IEEE Int. Symposium on New Frontiers in Dynamic Spectrum Access Networks*, Baltimore, Md., USA, November 2005— incorporated herein by reference in its entirety.

The spectrum sensing process consists of two stages: in-band spectrum sensing and out-band spectrum sensing. As the names suggest, in-band spectrum sensing is responsible for detecting any activity of other users, PUs, or other cognitive radio users, within the already accessed spectrum band, also known as the operating channel. On the other hand, out-band sensing aims at locating alternative vacant spectrum channels to be used whenever the operating channel is deemed busy or unsuitable. Upon detecting the presence of a co-channel interference source within the operating channel, the Cognitive Radio Network (CRN) acts differently depending on the type of interferer. However, in terms of its impact on the CRN performance, all sources of co-channel interference are equally harmful. While out-band spectrum sensing can be handled using a separate radio frequency unit, in-band sensing cannot be performed—using the conventional sensing methods—except when the CRN terminal is not engaged in a transmit/receive process, i.e., only when the terminal is in a Quiet Period (QP). However, since this period is consuming a valuable communication time, it is essential for the CRN terminal to minimize its duration as much as possible.

Observing this, Y.-C. Liang, Y. Zeng, E. Peh, and A. T. Hoang, "Sensing-throughput tradeoff for cognitive radio networks," *Wireless Communications, IEEE Transactions on*, vol. 7, no. 4, 2008—incorporated herein by reference in its entirety—formulated an optimization problem to find the optimal QP duration to achieve a certain performance level while maximizing the throughput. Alternatively, part of the operating channel can be reserved for continuous in-band sensing as described in Wolisz, D. Willkomm and A., "Efficient QoS support for secondary users in cognitive radio systems dynamic spectrum management," *Wireless Communications, IEEE*, vol. 17, no. 4, 2010—incorporated herein by reference in its entirety. However, this approach, known as partial spectrum sensing, lowers the throughput as well as complicates the in-band sensing stage.

In Ayman A. El-Saleh, Mahamod Ismail, Mohd Alaudin Mohd Ali., "Genetic algorithm-assisted soft fusion-based linear cooperative spectrum sensing," *IEICE Electron. Express*, vol. 8, no. 18, pp. 1527-1533, 2011, a genetic algorithm-assisted scheme (GA-assisted) was proposed that conquered the performance of other art of the state schemes. They utilized a new variant of GA known as Genetic Algorithm-Multi Parent Crossover (GA-MPC) as described in Saber M. Elsayed, Ruhul A. Sarker and Daryl L. Essam, "A new genetic algorithm for solving optimization problems," *Engineering Applications of Artificial Intelligence*, vol. 27, pp. 57-69, 2014 and Cross Entropy (CE) algorithm as described in Rubinstein, R. Y. and D. P. Kroese, "The Cross-Entropy Method: A Unified Approach to Combinatorial Optimization, Monte-Carlo Simulation and Machine Learning," Springer-Verlag, 2004) for spectrum sensing in Cognitive radio—each incorporated herein by reference in its entirety.

There are several patent documents that disclose various methods of spectrum sensing for cogonitive radio. For example, U.S. Pat. No. 7,860,197 discloses a spectrum sensing technique that uses a dual threshold to detect primary activity, and U.S. Patent Application Publication 2010/0086010 considers the problem of sensing and data communication by providing a cogonitive radio system with multiple radio frequency chains. U.S. Pat. No. 7,965,641 provides a robust cooperative spectrum sensing technique that employs a diversity of wireless channels with the aim to enhance the spectrum sensing performance of the cogonitive radio. In U.S. Patent Application Publication 2011/0085612, spectrum sensing is achieved by minimizing the probability of false alarm. In Chinese Unexamined Patent Application Publication CN108401255, a double-stage blind spectrum sensing method is described for the cogonitive radio, which utilizes autocorrelation and eigenvalue decomposition of covariance matrix of signal-to-noise ratio.

In M. A. Alrefaei, T. M. Shami and A. A. El-Saleh, "Genetic Algorithm with Multi-Parent Crossover for cooperative spectrum sensing," in 2015 *1st International Conference on Telematics and Future Generation Networks (TAFGEN)*, Kuala Lumpur, 2015—incorporated herein by reference in its entirety, the authors developed a Genetic Algorithm (GA) based spectrum sensing solution that maximizes the probability of detection for a fixed valued of probability of false alarm. A clustering GA based spectrum sensing scheme that also maximizes the probability of detection was proposed in M. A. Alrefaei, "Clustering Genetic Algorithm for Cognitive Radio Network," *Journal of Engineering Research and Application*, vol. 8, no. 6, pp. 54-57, June 2018—incorporated herein by reference in its entirety. The work described in T. M. Gojariya and R. S. Bansode, "Cyclostationarity-based spectrum sensing using beamforming algorithm in cognitive radio networks," in *International Conference & Workshop on Electronics & Telecommunication Engineering (ICWET* 2016), Mumbai, 2016 utilizes the cyclostationary property to provide beamforming for spectrum sensing.

Each of the aforementioned spectrum sensing and capacity allocation techniques suffers from one or more drawbacks hindering their adoption. Accordingly, the present disclosure describes a method for spectrum sensing that includes local spectrum sensing in a cognitive radio network using beamforming and energy detection for one or more secondary users and identifying the absence or presence of a primary user based on a primary user signal, a plurality of co-channel interferences, and sensing noise.

SUMMARY

In an exemplary embodiment, a method for spectrum sensing for cognitive radio includes performing a process of local spectrum sensing using receive beamforming and energy detection at each of a plurality of secondary users included in a cognitive radio network, wherein the process of local spectrum sensing decides between two hypotheses corresponding to absence and presence of a primary user, the two hypotheses being formulated using a primary user signal, a plurality of co-channel interferences, and sensing noise, the primary user signal, the plurality of co-channel interferences, and the sensing noise being received at each of the plurality of secondary users, and a set of beamforming weights of the receive beamforming is determined by optimizing a probability of detection and constraining a probability of false alarm.

In another exemplary embodiment, a cognitive radio system includes a plurality of secondary users, each of the plurality of secondary users performing a process of local spectrum sensing using receive beamforming and energy detection, wherein the process of local spectrum sensing decides between two hypotheses corresponding to absence and presence of a primary user, the two hypotheses being formulated using a primary user signal, a plurality of co-channel interferences, and sensing noise, the primary user signal, the plurality of co-channel interferences, and the sensing noise being received at each of the plurality of secondary users, and a set of beamforming weights of the receive beamforming is determined by optimizing a probability of detection and constraining a probability of false alarm.

In another exemplary embodiment, a communication device for a secondary user in a cognitive radio network includes: a plurality of antenna elements; a transceiver coupled to the plurality of antennas, the transceiver transmitting and receiving a communication signal to and from another communication device in the cognitive radio network for communication; and a controller coupled to the transceiver, the controller controlling beamforming of the plurality of antenna elements and performing a process of local spectrum sensing using receive beamforming and energy detection, wherein the process of local spectrum sensing decides between two hypotheses corresponding to absence and presence of a primary user, the two hypotheses being formulated using a primary user signal, a plurality of co-channel interferences, and sensing noise, the primary user signal, the plurality of co-channel interferences, and the sensing noise being received at the secondary user, and a set of beamforming weights of the receive beamforming is determined by optimizing a probability of detection and constraining a probability of false alarm.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
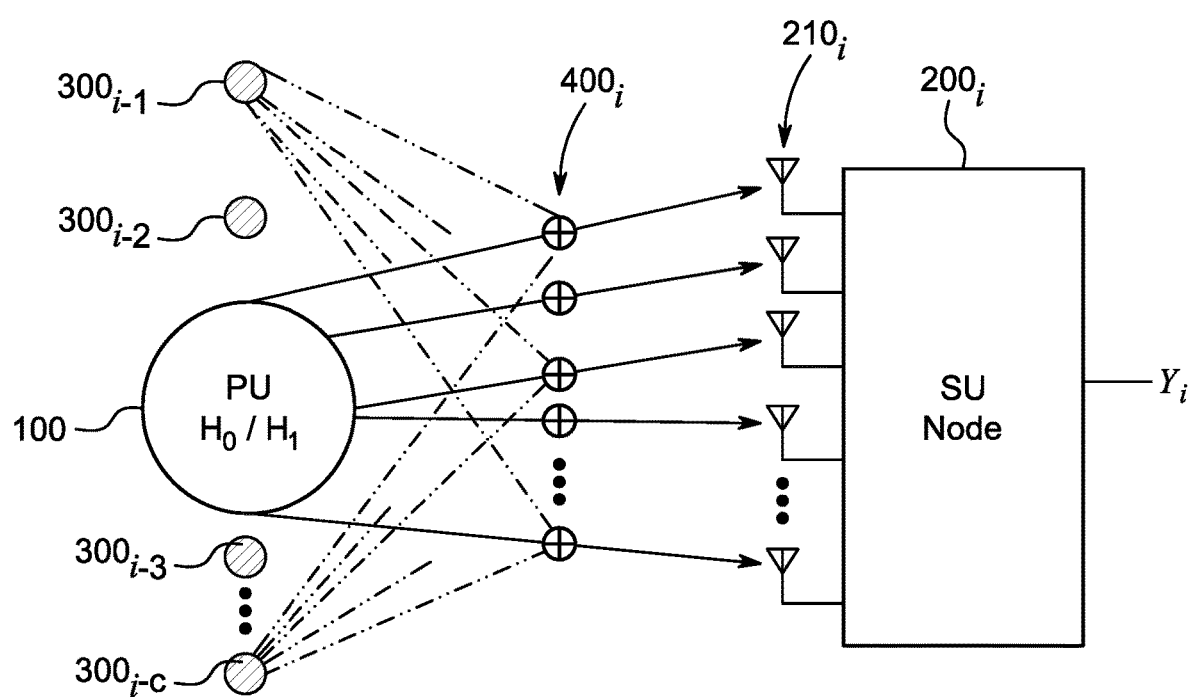
FIG. 1 is a schematic diagram of a spectrum sensing system, according to certain embodiments.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Most conventional spectrum sensing techniques assume only additive noise and ignore the effect of co-channel interference. Moreover, in deriving the probability of detection and probability of false alarm, a Gaussian assumption is employed for the received statistics at each node of a cognitive radio network. However, such an assumption is not always true in real practice.

To address these issues, the present disclosure provides a multiple antenna based spectrum sensing solution that takes into account the effect of co-channel interference in addition to additive noise. A multiple antenna is used to employ multiple antenna beamforming to enhance the performance of energy detection spectrum sensing.

Moreover, in this spectrum sensing solution, the probability of detection and probability of false alarm are derived without imposing a Gaussian assumption on received energy statistics. This is done by first reformulating the received test statistics in an Indefinite Quadratic Form and then utilizing a corresponding Cumulative Density Function to obtain the desired probabilities.

Moreover, using the derived probability of detection and probability of false alarm, two optimization algorithms, a genetic algorithm with multi-parent crossover and a cross entropy algorithm, are provided to determine a set of beamforming weights of the multiple antenna beamforming by optimizing the probability of detection and constraining the probability of false alram to below a certain required level.

The spectrum sensing techniques described in the present disclosure may be used for various wireless communication networks such as IEEE 802.22 Wireless Regional Area Networks (WRANs), IEEE 802.11 wireless local area networks (WLANs), or other Cognitive Radio technologies.

Cognitive Radio technology, such as that employed in IEEE 802.22 Wireless Regional Area Networks (WRANs), offers the opportunity to utilize spectrum that is licensed to primary users. This unused spectrum is often referred to as "white space" spectrum. One of the primary methods of identifying white space spectrum is using spectrum sensing technology. A spectrum sensing observes the spectrum for a period of time and then determines if the spectrum is occupied by a primary user or is available for use by a plurality of secondary users included in a cognitive radio network.

For example, the WRAN system operates on VHF/UHF TV bands from 54 MHz to 862 MHz by oppotunistically making use of unused TV channels. Each of secondary users included in the system may sense whether a RF spectrum is currently occupied by a licensed TV digital/analog television transmissions (primary user), and unoccupied channels may be used for unlicensed wireless network operations by the secondary users.

System Model for Multiple Antenna Based Spectrum Sensing

FIG. 1 is a schematic diagram of an exemplary cognitive radio system according to certain embodiments. In this cognitive radio system, a plurality of secondary users (SUs) are included, and each SU is equipped with multiple antennas. FIG. 1 illustrates ith node SU $200i$ in a cognitive radio network (CRN). The SU $200i$ is equipped with multiple antennas $210i$. The SU $200i$ performs multiple antenna-based spectrum sensing using beamforming and energy detection by receiving signals with the multiple antennas $210i$ and determining the presence or absence of a primary user (PU) 100 based on the received signals. In the present disclosure, it is assumed that the received signals include a signal transmitted from the PU 100, signals transmitted from a plurality of co-channel interference sources $300i$-1, $300i$-2, ..., $300i$-$c$, and sensing noise $400i$ when the PU 100 is present.

Next, a mathematical system model for the multiple antenna based spectrum sensing according to certain embodiments is described in detail. In this system model, each SU in the CRN performs local spectrum sensing independently of other SUs and makes a decision locally by processing the received signal via the energy detection approach. These local decisions are either 0 or 1 (0 denotes hypothesis $H_0$ and 1 denotes hypothesis $H_1$). Thus, the spectrum sensing task is to decide between the following two binary hypotheses:

Hypotheses $H_0$: when ith node decides the Primary User is absent, i.e., $$H_0 : x_{o,i}[t \mid H_o] = \sum_{c=1}^{c} \sqrt{E_{c,i}} h_{c,i}^H w_i x_{c,i}(t) + v_i(t) \quad (1)$$

Hypotheses $H_1$: when ith node decides the Primary User is present, i.e., $$H_1 : x_{o,i}[t \mid H_1] = \sqrt{E_o} h_{o,i}^H w x(t) + \sum_{c=1}^{c} \sqrt{E_{c,i}} h_{c,i}^H w_i x_{c,i}(t) + v_i(t) \quad (2)$$

where $x(t)$, $x_{c,i}(t)$, and $x_{o,i}[t]$ are the observed PU transmitted signal, the transmitted interference signal from the cth co-channel interference sources 300*i-c*, and the received signal at the ith sensing node, respectively. The vectors $h_{o,i}^H$ and $h_{c,i}^H$ represent the channel vectors for the observed PU 100 and the cth interference sources 300*i-c*, respectively (the notation $x^H$ represents the hermitian of vector x). These are assumed to be zero mean circularly symmetric complex Gaussian random vectors with correlation matrices $R_o$ and $R_c$, respectively. Here, $E_o$ and $E_{c,i}$ are respectively the average transmitted symbol energy experiences for the PU 100 and the cth interference source 300*i-c*. The variable $v_i(t)$ is the sensing noise 400*i* which is assumed to be complex White Gaussian random variable with zero mean and variance $\sigma_v^2$. The vector w contains the beamforming coefficients applied at the multiple antennas 210*i* of the SU 200*i*.

Let, $x_{o,i}[n]$ denotes the sampled version of the received signal $x_{o,i}[t]$, that is, $$x_{o,i}[n \mid H_o] = \sum_{c=1}^{c} \sqrt{E_{c,i}} h_{c,i}^H w_i x_{c,i}(nT_s) + v_i(nT_s) \quad (3)$$

$$x_{o,i}[n \mid H_1] = \sqrt{E_o} h_{o,i}^H w_i x(nT_s) + \sum_{c=1}^{c} \sqrt{E_{c,i}} h_{c,i}^H w_i x_{c,i}(nT_s) + v_i(nT_s) \quad (4)$$

where $i=1, 2, 3, 4, \ldots, M$, $c=1, 2, 3, 4, \ldots, C$, and $n=1, 2, 3, 4, \ldots, N$.

Since, the channel vectors and the noise terms are zero mean complex Gaussian random variables, the received signal $x_{o,i}[n]$ for the two hypotheses will also be zero mean complex Gaussian random variable, that is, $$x_i \mid H_0 \sim \mathcal{CN}(0, \sigma_{I+v}^2) \quad (5)$$

and $$x_i \mid H_1 \sim \mathcal{CN}(0, \sigma_{S+I+v}^2) \quad (6)$$

where $\sigma_{I+v}^2$ and $\sigma_{S+I+v}^2$ are the variance of the $x_{o,i}[n \mid H_o]$ and $x_{o,i}[n \mid H_1]$, respectively. Here, S and I represent the PU signal and interference signal terms, respectively. Knowing the fact that the noise and interference terms are independent, it is easy to show that $$\sigma_{I+v}^2 = E[II^*] + E[vv^*] = \sum_{c=1}^{c} E_c T_r[R_c w w^H] + \sigma_v^2 \quad (7)$$

where the trace property is employed to interchange the variables within expectation. In the above, the subscript i is dropped from w to simplify the notations.

Similarly, $\sigma_{S+I+v}^2$ can be computed as $$\sigma_{S+I+v}^2 = E_o T_r[R_o w w^H] + \sum_{c=1}^{c} E_c T_r[R_c w w^H] + \sigma_v^2 \quad (8)$$

To sense the spectrum, each SU measures the average energy of PU transmitted signal over an interval N which produces the following test statistic at the ith node:

$$y_i = \frac{1}{N} \sum_{n=1}^{N} |x_{o,i}[n]|^2 \quad (9)$$

which can be reformulated as Quadratic Form (QF) as $$y_i = \frac{1}{N} \|x\|^2 = \|x\|_{\frac{1}{N}I}^2 \quad (10)$$

where I is the identity matrix and $x=[x_{o,i}[1], x_{o,i}[2], x_{o,i}[3], \ldots, x_{o,i}[N]]^T$ is zero mean circular complex Gaussian random, that is, $x \sim \mathcal{CN}(0, R_x)$, with $R_x = \sigma_x^2 I$, where $$\sigma_x^2 = \begin{cases} \sum_{c=1}^{c} E_c T_r[R_c w w^H] + \sigma_v^2; & H_0 \\ E_o T_r[R_o w w^H] + \sum_{c=1}^{c} E_c T_r[R_c w w^H] + \sigma_v^2; & H_1 \end{cases} \quad (11)$$

Let $\tilde{x} \sim \mathcal{N}(0, I)$ be the whitened version of x which can be obtained as $$\tilde{x} = R_x^{-H/2} x \quad (12)$$

which allows to reformulate $y_i$ as $$y_i = \|\tilde{x}\|_A^2$$

$$A = R_x^{1/2} \frac{1}{N} I R_x^{H/2} = \sigma_x I \frac{1}{N} I \sigma_x I^H = \frac{\sigma_x^2}{N} I = \begin{bmatrix} \frac{\sigma_x^2}{N} & 0 & 0 \\ 0 & \frac{\sigma_x^2}{N} & 0 \\ 0 & 0 & \frac{\sigma_x^2}{N} \end{bmatrix} \quad (13)$$

Spectrum Sensing Solution Based on Beamforming

In certain embodiments, the spectrum sensing problem is formulated in such a way to find beamforming weights which maximize the probability of detection ($p_d$). Moreover, in order to have realistic and finite solution, the probability of false alarm ($p_f$) is constrained.

Next, the probability of detection ($p_d$) and probability of false alarm ($p_f$) are evaluated for ith node within CRN. These probabilities can be reformulated as follows:

$$p_{d_i} = P_r(y_i \geq \varepsilon_i | H_1) = 1 - P_r(y_i < \varepsilon_i | H_1) \quad (14)$$

$$p_{f_i} = P_r(y_i \geq \varepsilon_i | H_0) = 1 - P(y_i < \varepsilon_i | H_0) \quad (15)$$

The probabilities $P_r(y<\varepsilon|H_o)$ and $P(y<\varepsilon|H_1)$ can be found using the approach described in Tareq Y. Al-Naffouri, Muhammed Moinuddin, Nizar Ajeeb, Hassibi, and Aris L. Moustakas, "On the Distribution of Indefinite Quadratic Forms in Gaussian Random Variables," *IEEE TRANSACTIONS ON COMMUNICATIONS*, vol. 64, no. 1, 2016—incorporated herein by reference in its entirety, and can be shown to be $$P_r(y_i < \varepsilon_i | H_k) = u(y) - \sum_{n=1}^{N} \frac{\text{sign}^n(\lambda)}{\lambda^{n-1}\Gamma(n)} y^{n-1} e^{\frac{-y}{\lambda}} u\left(\frac{y}{\lambda}\right) \quad (16)$$

for k=0, 1. Here, sign( ) and u( ) represent the sign and unit step functions, respectively. The $$\lambda = \frac{\sigma_x^2}{N}$$

is the repeated eigenvalue of the matrix A.

Finally, the problem of spectrum sensing is formulated as follows:

$$w^{opt} = \arg\max(p_{d_i}), s.t.\ p_{f_i} \leq p_{f_{accept}} \quad (17)$$

where $w^{opt}$ is the optimum beamforming weight vector and $p_{f_{accept}}$ is the maximum acceptable probability of false alarm. This optimization task becomes NP hard as the number of possible solutions can be unlimited. For this reason, two heuristic algorithms are provided: Genetic Algorithm-Multi Parent Crossover (GA-MPC) and Cross Entropy (CE) algorithm, which are described next.

Genetic Algorithm-Multi Parent Crossover Based Weighting Scheme

The Genetic algorithm (GA) was developed based on the concept of human biology as described in M. Gen and R. Cheng, *Genetic Algorithms and Engineering Optimization*, First ed., December: John Wiley, 1999, the entire contents of which are herein incorporated by reference. A human contains cells, and each cell contains chromosomes (individuals). The number of combined chromosomes n as a possible solutions is called population p(t) which is initially randomly generated. Each chromosome contains genes that represent the variables (traits).

The meaning of chromosome/individuals in a GA is the solution of the fitness function where they are evaluated and result fitness value for each individual, which represents the degree of strength for an individual. A population that contains all of these generated chromosomes undergoes a process called reproduction. The production process is about transforming the first generated population into a new population that contains better chromosomes. This transformation is done by selection operation, crossover operation and mutation operation. In the end, the genetic algorithm seeks to find an optimal solution until a specified termination criterion is met, as described in M. Gen and R. Cheng, *Genetic Algorithms and Engineering Optimization*, First ed., December: John Wiley, 1999—incorporated herein by reference in its entirety.

The concept of GA-MPC is based on offspring in comparison to their parents, which should not be significantly more narrow to avoid losing diversity and premature convergence as described in Elsayed, Saber M., Ruhul A. Sarker and Daryl Essam, "GA with a new multi-parent crossover for solving IEEE-CEC2011 competition problems," in 2011 *IEEE Congress of Evolutionary Computation (CEC)*, LA, 2011, the entire contents of which are herein incorporated by reference. The three generated offspring are divided into two parts. Two of these offspring are used for exploitation while the third offspring is for exploration. In addition, premature convergence is avoided by a diversity operation in GA-MPC instead of mutation operation as described in Elsayed, Saber M., Ruhul A. Sarker and Daryl Essam, "GA with a new multi-parent crossover for solving IEEE-CEC2011 competition problems," in 2011 *IEEE Congress of Evolutionary Computation (CEC)*, LA, 2011.

Basically, GA-MPC has the same operators as used in Standard GA but with different methodologies. For instance, the selection mechanism of GA-MPC uses the tournament selection. In addition, the crossover operation is a multi-parent crossover instead of double parent crossover. Besides these, the mutation operation of GA is alternated with diversity operation in GA-MPC.

Figure 2:
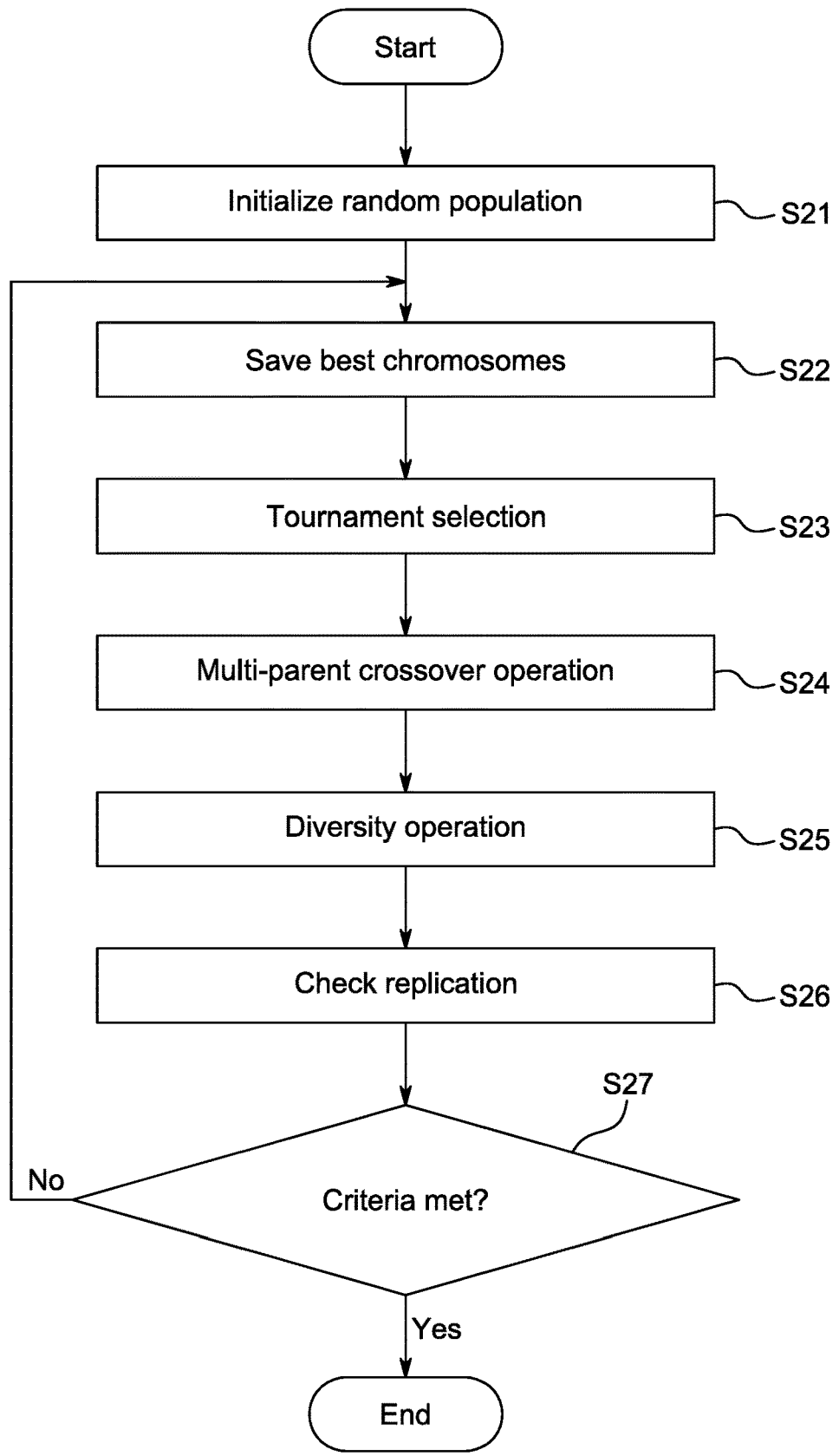
FIG. 2 is an exemplary flowchart of a genetic algorithm-multi parent crossover, according to certain embodiments.

FIG. 2 is an exemplary flowchart of GA-MPC, according to certain embodiments. At step S21, a random population is initialized with chromosome size of PS. Each chromosome has D number of variables, each of which is within a specific interval, as shown in the pseudo code of Table 1.

TABLE 1

| GA-MPC random population pseudo code |
|---|
| Set number of generation t = 0<br>For i = 1 : popsize (PS)<br>    For j = 1 : number of variables (D)<br>        $x^j_i = \underline{L} + [\text{rand} \times (\overline{U}_j - \underline{L})]$<br>    End<br>End<br>Where :rand $\in$ [0, 1], $\underline{L}_j \leq x_j \leq \overline{U}_j$, j = 1, 2, . . . ., D |

At step S22, the best m chromosomes (solutions) are saved in an archive pool (A), which is sorted according to their fitness function or according to their constraint violations. In certain embodiments, sorting is applied according to the specific constraint. Specifically, the largest possible value of probability of false alarm is used as constraint. Thus, in this GA-MPC, only those chromosomes are selected whose probability of false alarm is less than a preset constraint value. Henceforth, optimization is carried out to the selected chromosomes according to their probability of detection. This procedure is shown in the pseudo code of Table 2.

TABLE 2

| GA-MPC constraint implementation pseudo code |
|---|
| First of all, probability of detection ($p_d$) and probability of false alarm ($p_f$) of every solution within the population are evaluated.<br>Check if evaluated $p_f$ is less than the acceptable $p_f^A$, where analytical_$p_f$ stands as standard function<br>If $p_f$ meets the criteria, $p_f$ and its corresponding $p_d$ are kept in accepted archive and save their solutions x accordingly. Otherwise, neglect them and keep neglected $p_d$, $p_f$ and x in neglected archive. |

TABLE 2-continued

GA-MPC constraint implementation pseudo code

```
for i = 1:PopSize
    [p_d (i), p_f (i)] = evalObjFun(x(i,:));
        if p_f (i) <= p_f^A (i)
        accepted_x = [accepted_x; x(i,:)];
            accepted_p_d = [accepted_p_d; p_d (i)];
            accepted_p_f = [accepted_p_f; p_f (i)];
        else
        neglected_x = [neglected_x;x(i,:)];
            neglected_p_d = [neglected_p_d; pd (i)];
            neglected_p_f = [neglected_p_f; p_f (i)];
        end
    end
Second, the accepted archives are sorted according to p_d value in a
descending order. Consequently, rearrange its corresponding p_f and
solutions x according to the sorted index. Likewise, sorting the
neglected archives and perform the same steps of arrangement as
described below.
    [accepted_newfitx,acc_indecies] = sort(accepted_p_d, 'descend';
    accepted_x = accepted_x( acc_indecies, : );
    accepted_p_f = accepted_p_f ( acc_indecies, : );
    [neglected_newfitx, neg_indecies ] =
sort(neglected_p_d, 'descend');
    neglected_x = neglected_x( neg_indecies, : );
    neglected_p_f = neglected_p_f ( neg_indecies, : );
Finally, both the accepted archives and the neglected archives are
combined. Neglected archives are not vanished since there is a
possibility of occurring better solutions in the next generations.
    fitx = [accepted_newfitx; neglected_newfitx];
    x = [accepted_x; neglected_x];
    p_f = [accepted_p_f; neglected_p_f];
```

At step S23, a tournament selection procedure takes over with size TC (randomly 2 or 3) from which the best chromosome is picked and kept in the selection pool whose size is 3 times of population size 3*PS.

At step S24, a multi-parent crossover operation takes place with a chromosome rate (CR) for every consecutive individual, which are used in the selection pool to generate three distinguished offspring, as shown in the pseudo code of Table 3.

TABLE 3

GA-MPC crossover pseudo code

```
For i = 1:3:PopSize
β = Gaussian number with mean = 0.7 and standard
deviation = 0.1.
    produce three offspring o_i:
        ō_1 = x̄_1 + [β × (x̄_2 − x̄_3)]
        ō_2 = x̄_2 + [β × (x̄_3 − x̄_1)]
        ō_3 = x̄_3 + [β × (x̄_1 − x̄_2)]
    If any of the consecutive offspring similar as another offspring,
    substitute the unwanted offspring with a random chromosome
    from the selection pool
End
```

At step S25, after producing the three offspring via the multi-parent crossover operation, a diversity operation is applied with probability $P_m$, which helps the algorithm to avoid early convergence at a local optimum and search toward the global optimum in the search space. The pseudo code for the diversity operation is shown in Table 4.

TABLE 4

GA-MPC diversity pseudo code

```
For i = 1 : popsize (PS)
    For j = 1 : number of variables (D)
        If rand(0, 1) < diversity probability (p)
```

TABLE 4-continued

GA-MPC diversity pseudo code

```
            pick a random chromosome from the archive pool (A_arch).
            o^j_i = x^j_arch
        End
    End
End
```

At step S26, to avoid duplication, it is checked if any of the individuals is replicated after gathering all the individuals of archive pool with all the offspring. Then new population is constructed as shown in the pseudo code of Table 5.

TABLE 5

GA-MPC checking replicates pseudo code

```
For 1 = 1:PopSize
    For j = 1: n
        For k = 1: n
            x_{i,j} = x_{i,k} x_{i,j} = x_{i,j} + N (0.5 × u, 0.25 * u) where
            u ∈ [0, 1]
        END
    END
END
```

At step 27, the algorithm is terminated when preset specific criteria are met, otherwise repeat from step S22 with t=t+1.

Cross-Entropy Based Weighting Scheme

There are many methods to estimate an unknown objective function. One of these methods is discrete event simulation. However, an even more popular way to solve such problem is by stochastic (or randomize) algorithm, particularly via the simulated cross-entropy or just the cross-entropy (CE) method highlighted in Rubinstein, R. Y. and A. Shapiro, "Sensitivity Analysis and Stochastic Optimization via the Score Function Method," in *Discrete Event Systems,* 1993, the entire contents of which are herein incorporated by reference.

The cross-entropy method is originated from the name cross-entropy (or Kullback-Liebler) distance, which is believed to be the main aspect of the contemporary information theory as described in Rubinstein, R. Y. and D. P. Kroese, "The Cross-Entropy Method: A Unified Approach to Combinatorial Optimization, Monte-Carlo Simulation and Machine Learning," Springer-Verlag, 2004), the entire contents of which are herein incorporated by reference. The method is an adaptive algorithm for estimating probabilities of rare events in complex stochastic networks as described in Rubinstein, R. Y. and D. P. Kroese, "The Cross-Entropy Method: A Unified Approach to Combinatorial Optimization, Monte-Carlo Simulation and Machine Learning," Springer-Verlag, 2004), which contains variance minimization. It was later observed in R. Rubinstein, "Cross-Entropy and Rare-Events for Maximal Cut and Bipartition Problems," *ACM Transactions on Modeling and Computer Simulation,* 2002, the entire contents of which are herein incorporated by reference, that a little modification of Rubinstein, R. Y. and B. Melamed., "Modern Simulation and Modeling," *Wiley series in probability and Statistics,* 1998, the entire contents of which are herein incorporated by reference, with CE minimization, would possibly tackle hard combinatorial optimization and continuous multi-extremal problems as well, rather than being used only for estimating probabilities of rare events. This is produced by first having the "deterministic" optimization problem translated into a form of "stochastic" problem, and later, the rare event simulation mechanism same as in R. Rubinstein, "Cross-Entropy and Rare-Events for Maximal Cut and Bipartition Problems," *ACM Transactions on Modeling and Computer Simulation*, 2002 is implemented.

The CE method contains two main iterative procedures, which can be illustrated as below, as described in Rubinstein, R. Y. and D. P. Kroese, "The Cross-Entropy Method: A Unified Approach to Combinatorial Optimization, Monte-Carlo Simulation and Machine Learning," Springer-Verlag, 2004)—incorporated herein by reference in its entirety:

(1) Randomly generate sample of data (trajectories, vectors, etc.) regarding a certain technique, and
(2) Update the parameters of the random mechanism based on the data to produce a "better" sample in the next iteration.

In general, the CE method derives its power from the fact that it uses updating rules, which are usually easy and straightforward; therefore, it is fast. Additionally, this method enjoys a well-defined mathematical approach and gives an optimal solution in most of cases. Moreover, it provides a unique approach to optimization and simulation and possesses a good opportunity for having new frontiers in those particular areas. Lately, cross-entropy is being used in a huge variety of applications.

The main idea behind the CE method for optimization can be explained as follows. Assuming that the performance function $S(x)$ is to be maximized throughout all states x in some set $\chi$. Let $\gamma^*$ be an indication for maximum, therefore $$\gamma^* = \max_{x \in \chi} S(x) \quad (18)$$

After knowing the maximum and which function to maximize, the CE algorithm can be described in more detail, as described in Giannakis, Z. Tian and G., "A wavelet approach to wideband spectrum sensing for cognitive radios," in *IEEE Int. Conf. Cogn. Radio Oriented Wireless Netw. Comm.*, Mykonos Island, Greece, June 2006, the entire contents of which are herein incorporated by reference.

Figure 3:
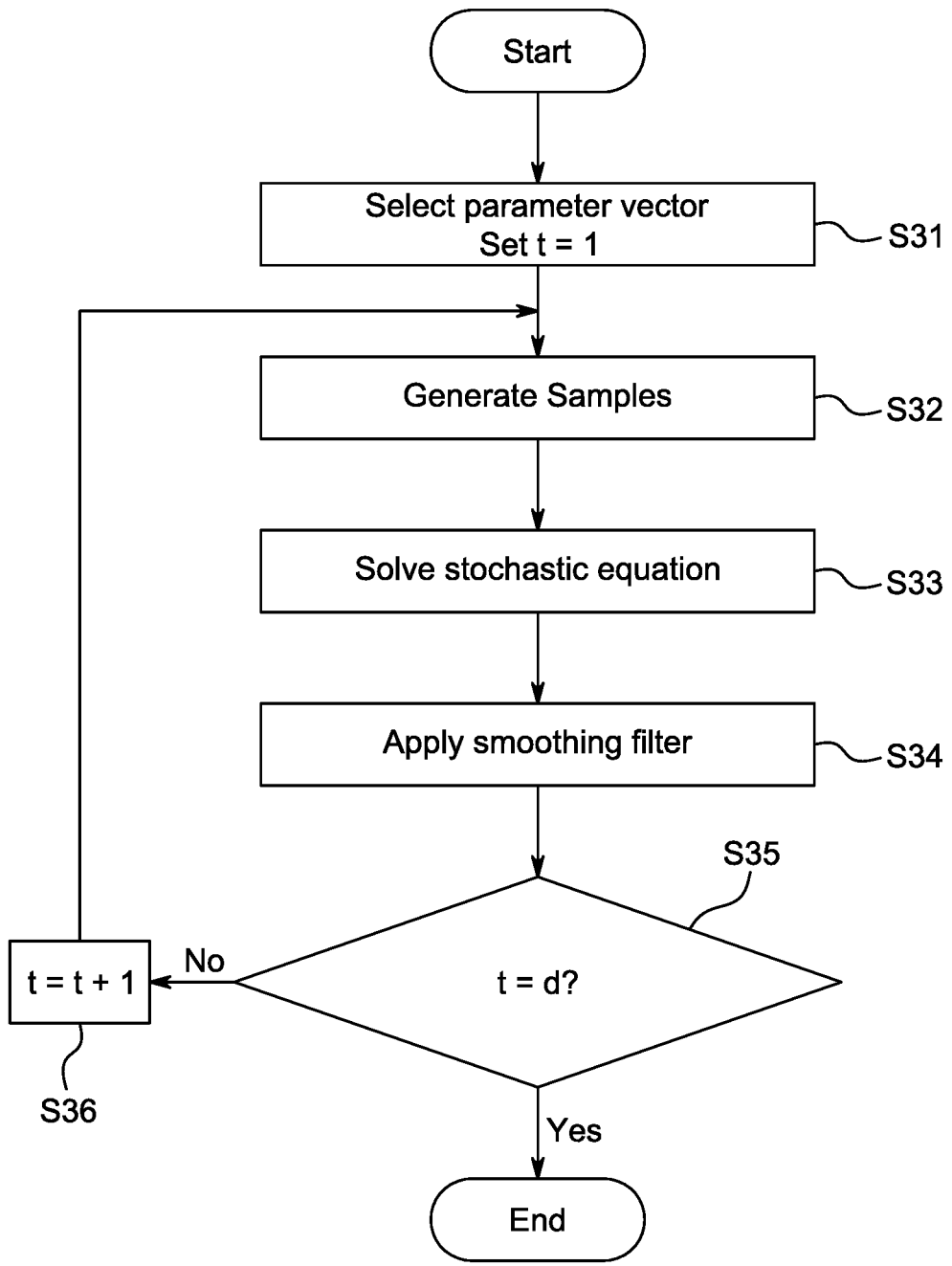
FIG. 3 is an exemplary flowchart of a cross-entropy algorithm, according to certain embodiments.

FIG. 3 is an exemplary flowchart of CE, according to certain embodiments. At step S31, a parameter vector $\hat{v}_0$ is chosen, and counter variable t is set to 1. At step S32, from the density $f(.;v_{t-1})$, samples $X_1, \ldots, X_N$ are generated. Then, the sample $(1-\varrho)$-quantile $(\hat{\gamma}_t)$ is computed in accordance with the following relation:

$$\hat{\gamma}_t = S_{(\lceil(1-\varrho)N\rceil)} \quad (19)$$

where, $\hat{\gamma}_t$ is the simple estimator.

At step S33, samples $X_1, \ldots, X_N$ are used to solve the following stochastic equation:

$$\max_v \hat{D} = \frac{1}{N}\sum_{i=1}^{N} I_{\{s(x_i) \geq \hat{\gamma}_t\}} \ln f(X_i; v) \quad (20)$$

and the output by $\tilde{v}_t$ is computed. Subsequently, at step S34, a smoothing filter is applied using the following:

$$\tilde{v}_t = \alpha \tilde{v}_t + (1-\alpha)\tilde{v}_{t-1} \quad (21)$$

where $\alpha$ is the smoothening parameter.

At step S35, if t has reached the counter limit, for example, d=10, and t≥d, $$\hat{\gamma}_t = \hat{\gamma}_{t-1} = \ldots = \hat{\gamma}_{t-d} \quad (22)$$

Here the process is stopped, and let t be the indication for the final solution; otherwise, at step S36, t is increased by setting t=t+1 and go back to step S32. Table 6 shows exemplary pseudo code of CE iteration continuity.

TABLE 6

Iteration Continuity

1. Initialize the parameters:
   $[t_0, t_{max}, N, n, q, \alpha, \beta, N^{elite}]$
   where $t_0$ is the initial iteration, $t_{max}$ is the final iteration, and n is the number of dimensions. And the rest q, $\alpha$, $\beta$, and $N^{elite}$ are parameters described in the above.
2. Generate the mean (M) randomly between any two intervals, for example, [− 2, 2].
   M = − 2 + 4 * rand(1, n).
3. Generate the variance (D) deterministically.
   D = 10000.0 * ones(1, n).
4. For t = $t_0$: $t_{max}$
   Update M using $\alpha$ smoothing parameters.
   M = $\alpha$ * M + (1 − $\alpha$) * M.
Update D using $\beta$ smoothing scheme.

$$\beta_t = \beta - \beta\left(1 - \frac{1}{t}\right)^q;$$

D = $\beta_t$ * D + (1 − $\beta_t$) * D
Generate R = randn(N, n);
Find x = f (R, M, D), complex numbers
   X(V, :) = M + std. * R(V, :) + 1i * (M + std. * R(V, :));
Evaluate SA = f(x)
After evaluating the solutions, the same constraint as in GA-MPC is applied to optimize $p_d$ with the lowest value of $p_f$ and sort them according to their best fitness
   SA = "call the objective function you want to optimize";
Sort SA "in descending order to maximize $p_d$"
   [S_Sort,V_Sort] = sort(SA);
   Determine the best of elite set
      S_Best(t) = S_Sort(1);
   Determine the worst of elite set
      Gamma(t) = S_Sort($N^{elite}$);
   Determine the best performance from S_Best(t)
      $S_{max(t)}$ = max(S_Best(t))
   Determine the level $\hat{\gamma}_t$ from Gamma(t); to continuously find the maximum performance find the global maximum
      global$_{max}$ = $S_{max(t)}$
   Identify the best set of (elite)
      $X_{elite}$ = X($V_{Sort}$ (1: $N^{elite}$), :);
   From best set (elite) find M
      M = mean ($X_{elite}$);
   From best set of (elite) find D
      D = (std($X_{elite}$)$^2$.);
End Performance Monte Carlo simulations were performed for the probability of detection and probability of false alarm for ith SU node whose antenna contains of 5 elements. The results were obtained by averaging the results over 10,000 trials. The number of co-channel interferences used are also 5.

Validation of Analytical Results

Figure 4:
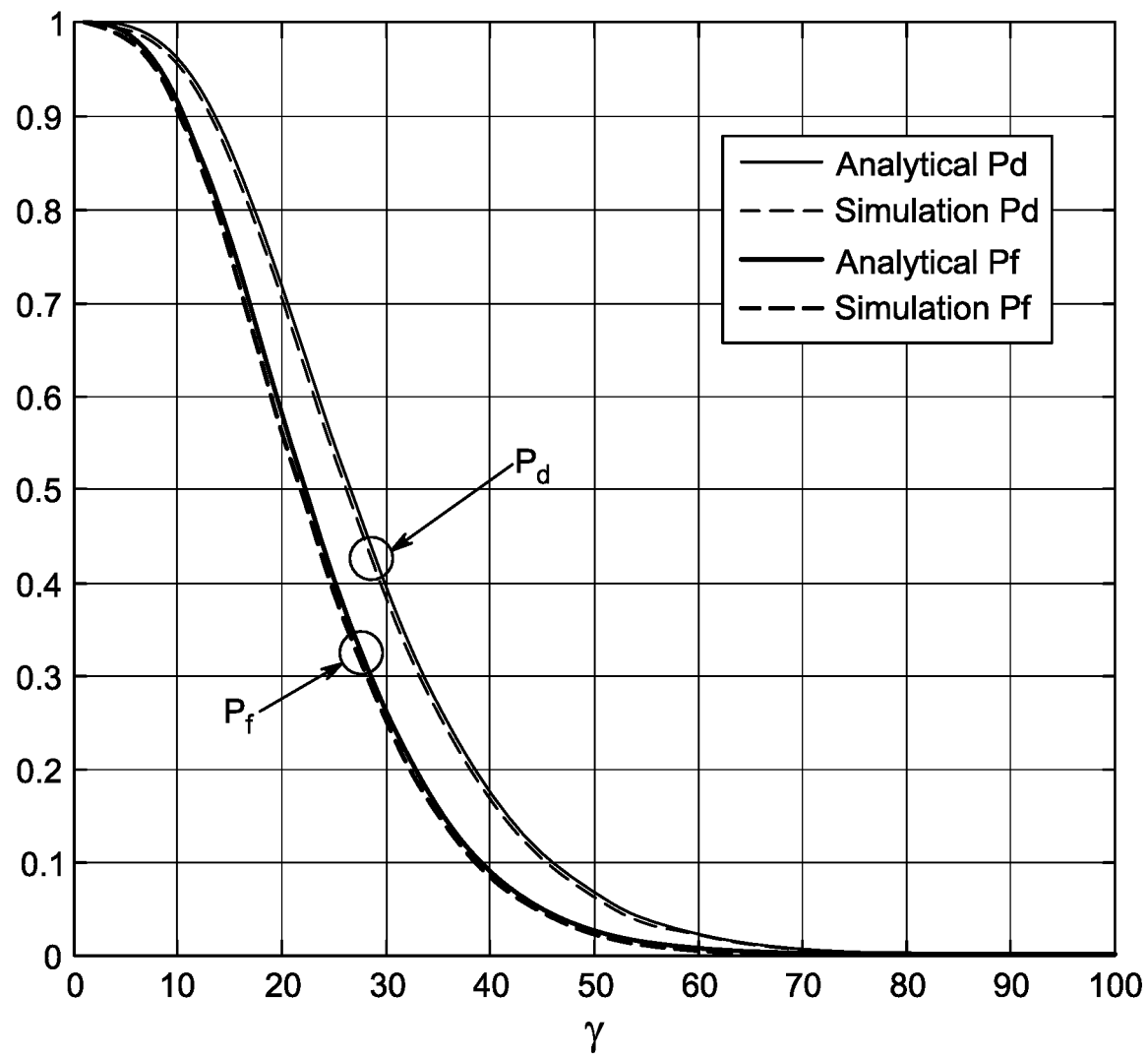
FIG. 4 is simulation and analytical results for the probability of detection and the probability of false alarm in local decision at a particular secondary user node in a cognitive radio network.

FIG. 4 shows the comparison between the results via derived analytical expressions are compared with simulations for $p_d$ and $p_f$. It can be seen that there is a good agreement between theory and simulations.

Effect of System Parameters

The effect on the performance of the foregoing spectrum sensing solution is analyzed for various system parameters.

Figure 5:
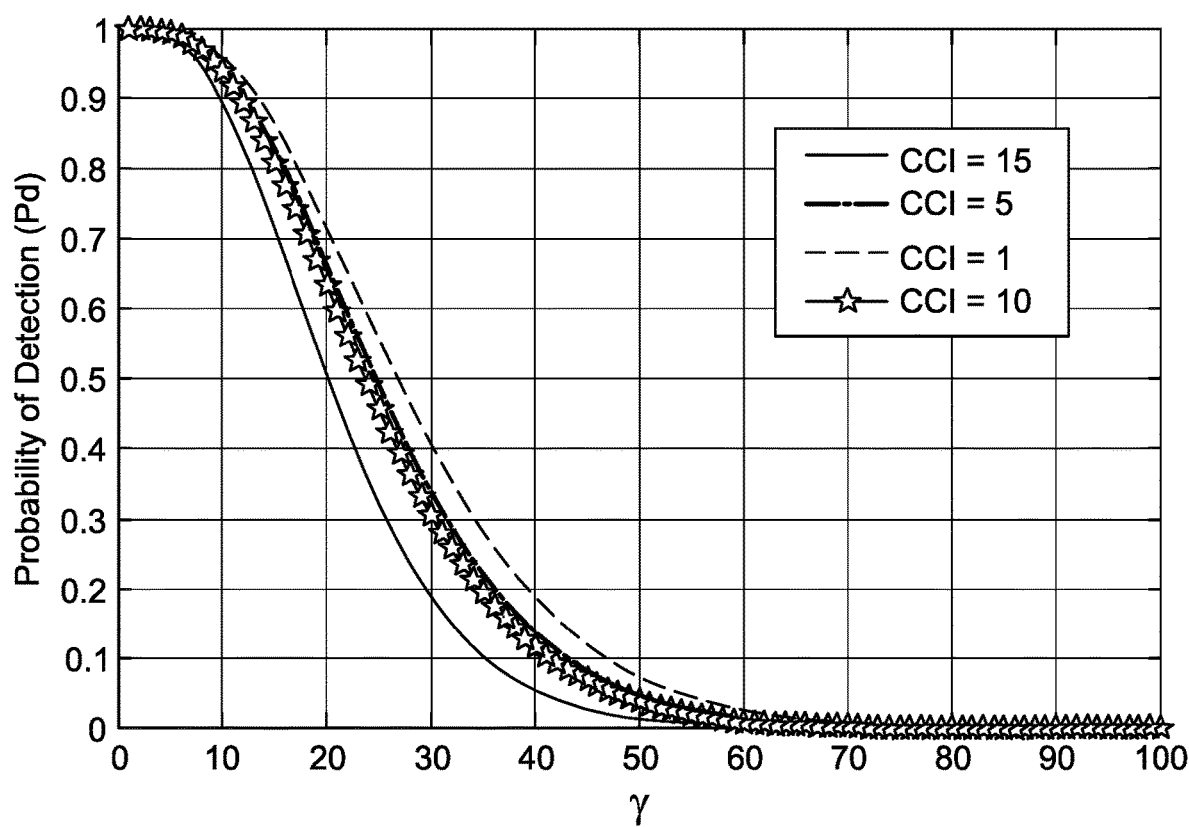
FIG. 5 is a graph illustrating impact of co-channel interference on the probability of detection.

First, the effect of the number of co-channel interferences on the probability of detection ($p_d$) was investigated. Here, the number of co-channel interferences (CCI) of 1, 5, 10, and 15 was used. The results are reported in FIG. 5, which show that the increase in the number of co-channel interference causes a decrease in $p_d$. Thus, the co-channel interference nodes are the limiting factors for $p_d$.

Figure 6:
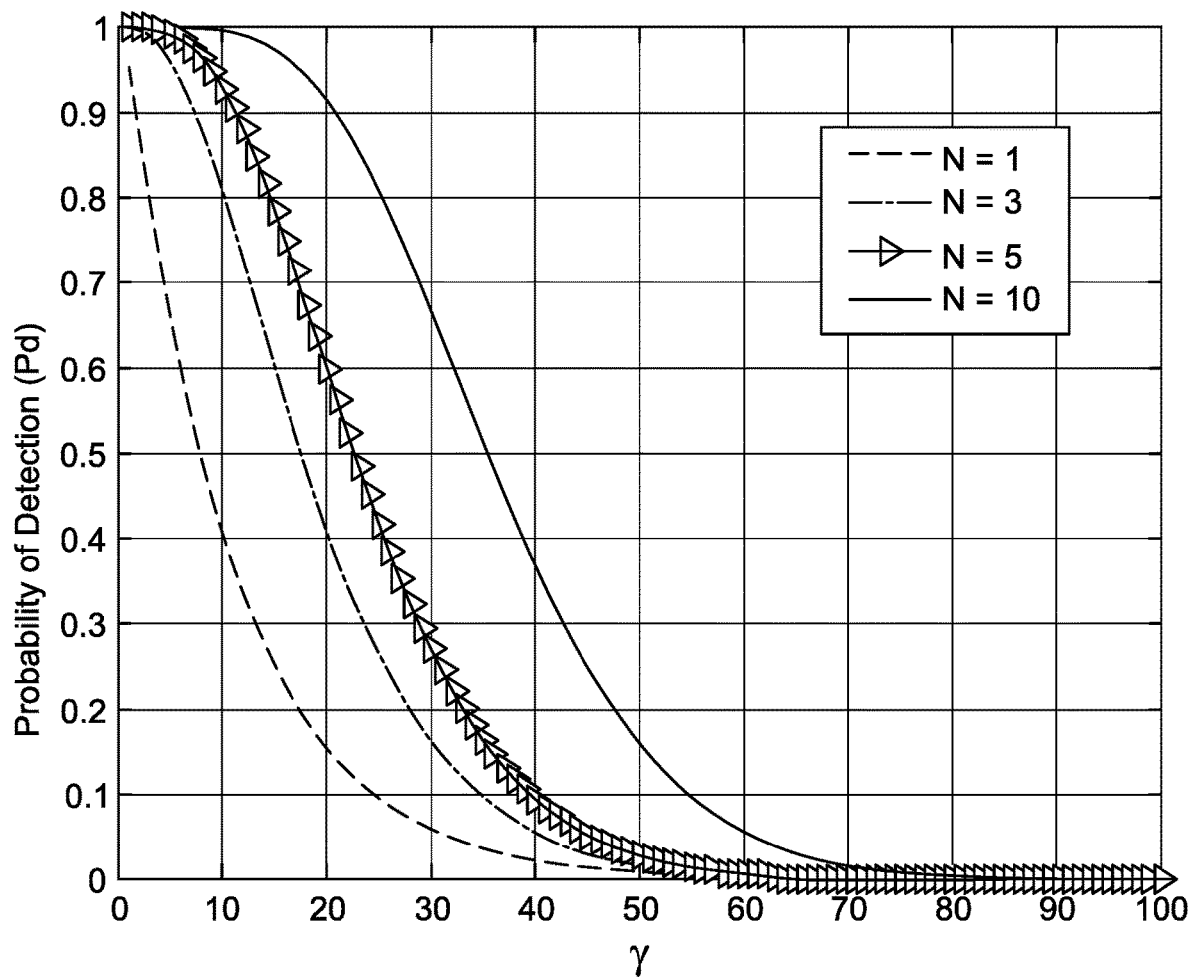
FIG. 6 is a graph illustrating impact of numbers of samples on the probability of detection.

Next, the effect of the number of samples was observed. For this, sample sizes (N) of 1, 3, 5, and 10 were used. It can be seen from FIG. 6 that the increase in the number of samples improves the performance of the probability of detection. However, the number of transmitted samples in any CRN should not be high to avoid higher bandwidth requirement. On the other hand, the number of samples shouldn't be so low to avoid poor performance.

Performance of GA-MPC and CE Optimizations

The GA-MPC and the CE optimization algorithms described above are implemented to obtain values for a set of beamforming weights for the multiple antennas of a SU by maximizing the probability of detection while constraining the probability of false alarm to an acceptable level.

First, the parameters utilized are defined. Average transmitted symbol energies of both the PU signal and the co-channel interference ($E_o/E_c$) are set to 1. The noise variance of the Additive White Gaussian (AWG) is set to 0.01 (i.e., $\sigma_n^2 = 0.01$). Number of co-channel interference nodes is 5 (CCI=5), which transmit samples equal to 5 (N=5). The receiving antennas at the SUs are considered to have five elements ($A_M=5$). The design parameters of GA-MPC and CE are listed in Table 7.

TABLE 7

Parameters for GA-MPC and CE Algorithms

| Parameters | GA-MPC Parameters | CE parameters |
|---|---|---|
| Population size | 100 | 100 |
| No. of iteration | 100 | 100 |
| Range of Search Space | {0, 1} | {0, 1} |
| Weightings | Complex Random | Complex Random |
| Probability of Crossover | 70% | — |
| Probability of Diversity | 20% | — |
| Elite Sample ($N^{elite}$) | — | 5 |
| Beta (β) | — | 98% |
| Alfa (α) | — | 50% |
| Integer (q) | — | 9 |

Figure 7:
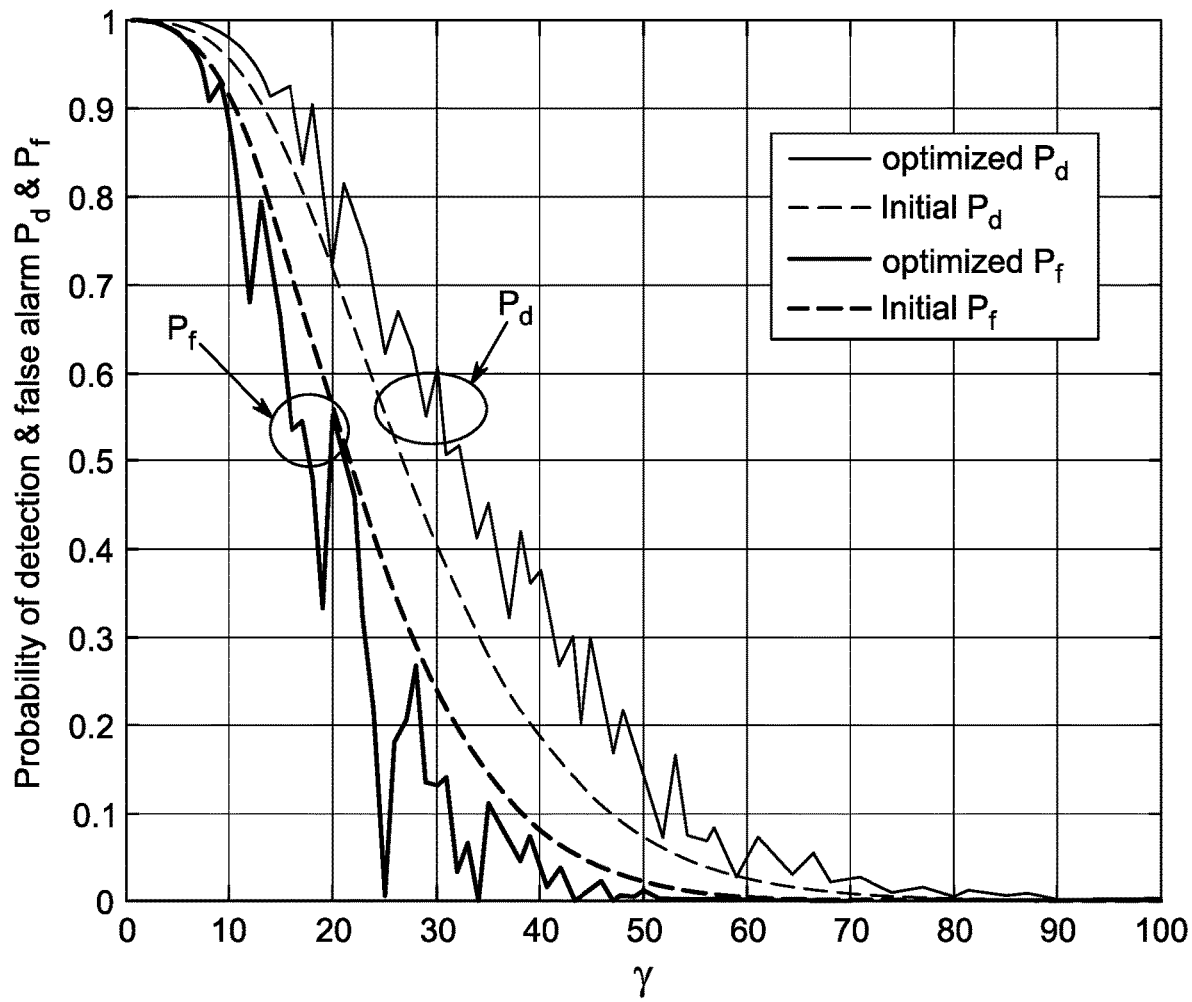
FIG. 7 is a graph illustrating performance of a genetic algorithm-multi parent crossover.
Figure 8:
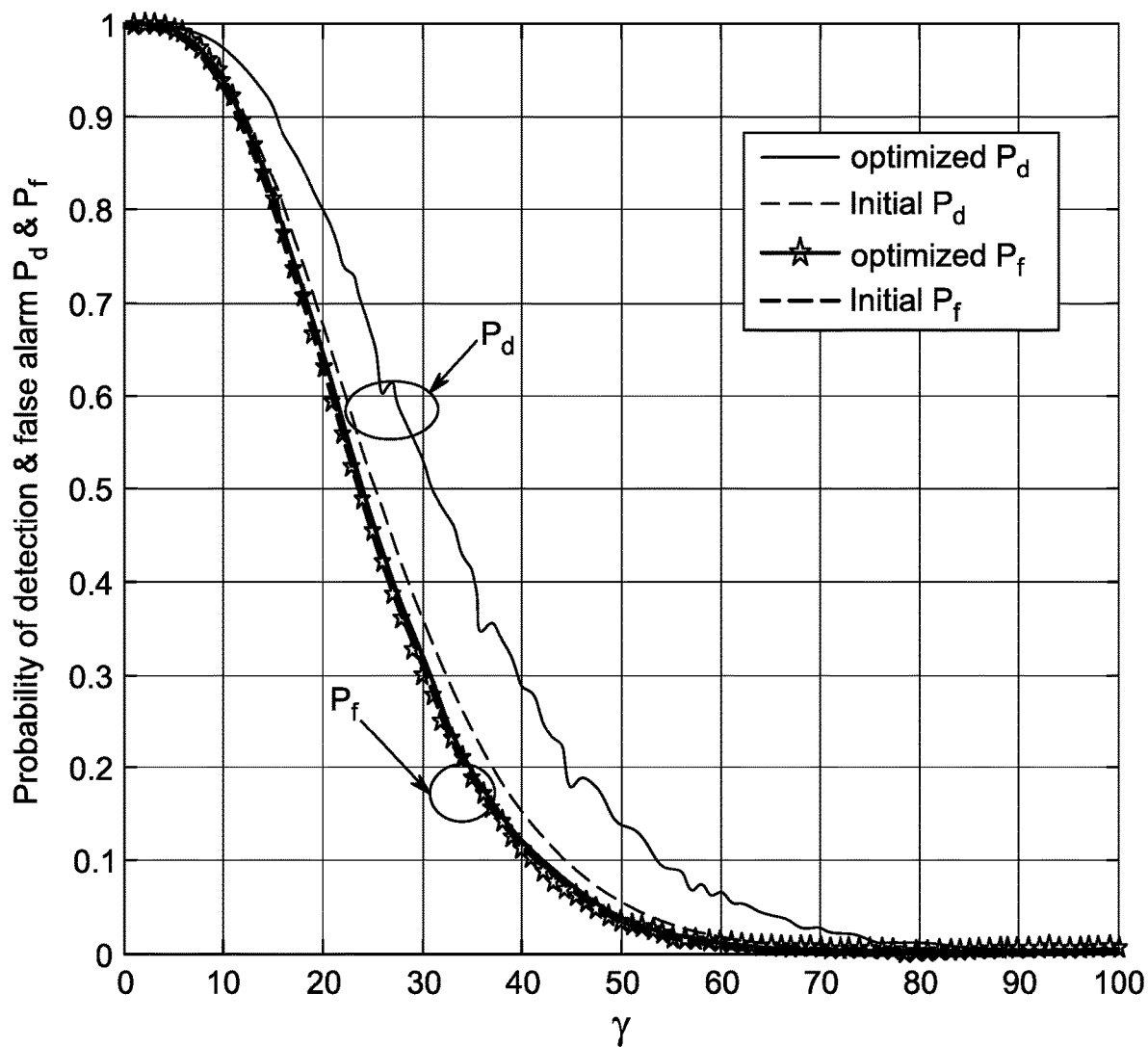
FIG. 8 is a graph illustrating performance of a cross-entropy algorithm.

FIG. 7 shows both $p_d$ and $p_f$ values before and after optimization by GA-MPC. It can be easily seen that GA-MPC is able to optimize the beamforming weights such that it maximizes the initial $p_d$ while maintaining $p_f$ below the required acceptable level. FIG. 8 shows the $p_d$ and $p_f$ values before and after optimization by the CE. Here again the improvement in the $p_d$ is observed. The CE method maintains the required acceptance level of $p_f$ but could not minimize its value. In this sense, it can be concluded that GA-MPC performed better than CE in the considered spectrum sensing problem.

Communication Device

Figure 9:
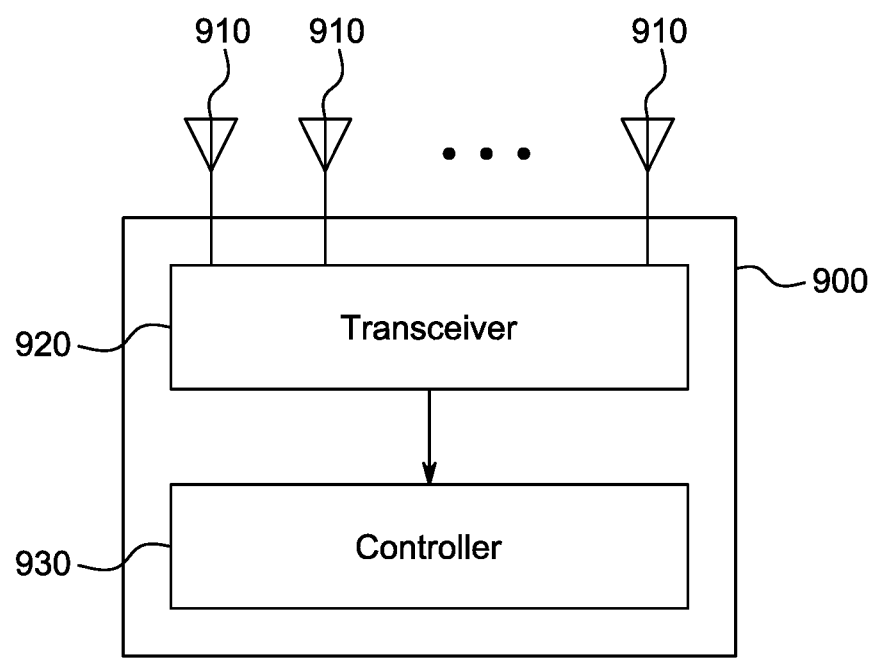
FIG. 9 is a schematic diagram illustrating an exemplary configuration of a communication device for a secondary user in a cognitive radio network, according to certain embodiments.

An exemplary communication device for use in a SU node in the CRN is described. FIG. 9 illustrates an exemplary configuration of a communication device 900 according to certain embodiments. The communication device 900 includes a plurality of antenna elements 910, a transceiver 920, and a controller 930. The plurality of antenna elements 910 corresponds to the multiple antennas 210i of the SU 200i illustrated in FIG. 1 and may be, for example, an array antenna. Each antenna element of the plurality of antenna elements 910 is connected to a phase shifter to enable receive beamforming for spectrum sensing. Each phase shifter is controlled directly or indirectly by the controller 930.

The transceiver 920 is coupled to the plurality of antenna elements 910 and transmits and receives a communication signal to and from another communication device for another SU node in the CRN using at least one of the plurality of antenna elements 910 for communication. The number of the antenna elements 910 to be used for communication is not limited to any particular number and may be determined according to wireless communication standards to be employed for communication in the CRN.

The controller 930 is coupled to the transceiver 920 and the foregoing phase shifters for controlling beamforming of the plurality of antenna elements 910. The controller 930 performs a process of local spectrum sensing using receive beamforming and energy detection according to the foregoing embodiments. Specifically, the communication device 900 measures signals in a target frequency band and decides between two hypotheses corresponding to absence and presence of a PU. Further, a set of beamforming weights of the receive beamforming for the plurality of antenna elements 910 is determined by optimizing the probability of detection and constraining the probability of false alarm to below a certain required level using GA-MPC or CE algorithm according to the foregoing embodiments.

The novel spectrum sensing solution using receive beamforming via multiple antenna employment at each secondary user (SU) in the cognitive radio network (CRN) is provided. The detector is based on energy estimation of the received signals. The impact of co-channel interference (CCI) is also considered. Consequently, the expressions for the probability of detection ($p_d$) and probability of false alarm ($p_f$) are derived using Indefinite Quadratic Form (IQF) approach. A suitable beamformer is provided by optimizing $p_d$ while constraining $p_f$ to below a preset certain required level. For this purpose, two heuristic algorithms are provided: Genetic Algorithm with Multi-Parent Crossover (GA-MPC) and Cross Entropy (CE) algorithm. Both the algorithms provide the beamforming vectors which can maximize $p_d$ while achieving the constraints on $p_f$. Compared to the CE based algorithm, the GA-MPC based algorithm provides better performance in constraining $p_f$.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A method for spectrum sensing a frequency spectrum unoccupied by one or more primary users for assignment to a plurality of secondary users in a cognitive radio network, each secondary user including a controller and multiple antennas, comprising:

local spectrum sensing, by the multiple antennas of each secondary user, using receive beamforming and energy detection;

determining from the receive beamforming and energy detection, by the controller of each secondary user, an absence or a presence of a primary user by using two hypotheses, wherein a first hypothesis, $H_0$, of the two hypotheses determines the absence of a primary user based on receiving a plurality of co-channel interferences, beamforming weights and sensing noise, and a second hypothesis, $H_1$, of the two hypotheses determines the presence of a primary user based on detecting a primary user signal, and receiving a plurality of co-channel interferences, beamforming weights and sensing noise;

determining, by the controller of each secondary user, a set of beamforming weights of the receive beamforming with a probability of detection and constraining a probability of false alarm, optimizing, by the controller of each secondary user, the probability of detection and constraining the probability of false alarm with a genetic algorithm having multi-parent crossover by:
initializing a random population,
saving best chromosomes from an initialized random population by sorting according to corresponding constraint violations,
performing a tournament selection,
performing a multi-parent crossover operation,
performing a diversity operation, and
checking replication.

2. The method of claim 1, wherein in the step of initializing a random population, each chromosome has a preset number of variables, each of which is within a specific interval.

3. The method of claim 1, wherein in the step of saving best chromosomes, a largest possible value of the probability of false alarm is used as the constraint.

4. The method of claim 1, wherein the step of saving best chromosomes is performed in such a manner as to select chromosomes whose probability of false alarm is less than a preset constraint value.

* * * * *

UNITED STATES PATENT AND TRADEMARK OFFICE
CERTIFICATE OF CORRECTION

Page 1 of 1

PATENT NO. : 10,880,752 B1
APPLICATION NO. : 16/985857
DATED : December 29, 2020
INVENTOR(S) : Muhammed Moinuddin et al.

It is certified that error appears in the above-identified patent and that said Letters Patent is hereby corrected as shown below:

On the Title Page

Item (72):
Inventors: Muhammed Moinuddin, Jeddah (SA);
 Ubaid M. Al-Saggaf, Jeddah (SA);
 Mohammed A. ALREFAEI, Jeddah (SA);
 Jawwad Ahmad, Jeddah (SA)

Should read:
--Inventors: Muhammed Moinuddin, Jeddah (SA);
 Ubaid M. Al-Saggaf, Jeddah (SA);
 Mohammed A. ALREFAEI, Jeddah (SA);
 Jawwad Ahmad, Karachi (PK)--

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*